(12) United States Patent
Kim et al.

(10) Patent No.: US 8,520,113 B2
(45) Date of Patent: Aug. 27, 2013

(54) DIGITAL PHOTOGRAPHING APPARATUS, METHOD OF CONTROLLING THE SAME, AND RECORDING MEDIUM STORING PROGRAM TO EXECUTE THE METHOD

(75) Inventors: Hye-jin Kim, Seoul (KR); Jun-ho Choi, Seoul (KR); Dong-kyu Cha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 258 days.

(21) Appl. No.: 12/852,210

(22) Filed: Aug. 6, 2010

(65) Prior Publication Data
US 2011/0032377 A1 Feb. 10, 2011

(30) Foreign Application Priority Data
Aug. 7, 2009 (KR) .................. 10-2009-0072959

(51) Int. Cl.
*H04N 5/222* (2006.01)

(52) U.S. Cl.
USPC .................................................... 348/333.01

(58) Field of Classification Search
USPC ............... 348/207.99, 208.2, 333.01, 333.02, 348/333.03, 333.11, 333.13, 345, 349, 373–376; 382/118
See application file for complete search history.

(56) References Cited

U.S. PATENT DOCUMENTS

| | | | | |
|---|---|---|---|---|
| 6,937,281 | B1* | 8/2005 | Ogawa | 348/333.12 |
| 2006/0176388 | A1* | 8/2006 | Kinjo | 348/333.01 |
| 2007/0195174 | A1* | 8/2007 | Oren | 348/222.1 |
| 2008/0170132 | A1* | 7/2008 | Yi et al. | 348/222.1 |
| 2008/0278455 | A1* | 11/2008 | Atkins et al. | 345/173 |
| 2009/0002516 | A1* | 1/2009 | Suzuki et al. | 348/223.1 |
| 2009/0180007 | A1* | 7/2009 | Eun | 348/231.99 |
| 2010/0149398 | A1* | 6/2010 | Gayer | 348/333.01 |
| 2010/0165119 | A1* | 7/2010 | Tang et al. | 348/207.11 |

OTHER PUBLICATIONS

"Digital Camera Magazine—Olympus Stylus Tough 6000", Jan. 2009.*

* cited by examiner

*Primary Examiner* — Aung S Moe
*Assistant Examiner* — Chriss Yoder, III
(74) *Attorney, Agent, or Firm* — Drinker Biddle & Reath LLP (57) ABSTRACT

Provided are a digital photographing apparatus capable of taking a self-shot, a method of controlling the same, and a recording medium storing a program to execute the method. A digital photographing apparatus includes a shooting unit, configured to generate a live image of a subject; a main display unit, configured to display the generated image; an auxiliary display unit mounted on a front of the digital photographing apparatus and configured to display the generated image; a determination unit configured to determine whether the auxiliary display unit is switched on or off; and a self-shot setting unit configured to set a self-shot mode when the auxiliary display unit is switched from an 'off' state to an 'on' state.

18 Claims, 6 Drawing Sheets

DIGITAL PHOTOGRAPHING APPARATUS, METHOD OF CONTROLLING THE SAME, AND RECORDING MEDIUM STORING PROGRAM TO EXECUTE THE METHOD

CROSS-REFERENCE TO RELATED PATENT APPLICATION

This application claims the benefit of Korean Patent Application No. 10-2009-0072959, filed on Aug. 7, 2009, in the Korean Intellectual Property Office, the entire disclosure of which is incorporated herein by reference.

BACKGROUND OF THE INVENTION

1. Field of the Invention

The invention relates to a digital photographing apparatus, a method of controlling the same, and a recording medium storing a program to execute the method.

2. Description of the Related Art

Many users use digital photographing apparatuses, such as digital cameras and digital camcorders, in order to photograph other persons, objects, or sceneries. However, recently some users have been using digital photographing apparatuses to photograph themselves, i.e., to take what is called a 'self-shot'. Here, the term 'self-shot' does not mean a specially designed function but means a user photographing himself or herself by holding a digital photographing apparatus in such a way that a lens of the digital photographing apparatus faces the user and by pressing a shutter release button.

However, the quality of a self-shot image may not be as good as an image not of a self-shot, because the user may not be able to see a display unit displaying a preview image, which is often located on the back of the digital photographing apparatus. Thus, the user may have difficulties determining a composition in which the shooting is to be performed or have difficulties determining whether he or she is in focus. Furthermore, after the self-shot image is captured, a quick-view image is likely to end before the user has time to turn the digital photographing apparatus around to check the quick-view image.

SUMMARY OF THE INVENTION

The invention provides a digital photographing apparatus capable of taking a self-shot, a method of controlling the same, and a recording medium storing a program to execute the method.

Embodiments of the invention provide a digital photographing apparatus including a shooting unit, configured to generate a live image of a subject; a main display unit, configured to display the generated image; an auxiliary display unit mounted on a front of the digital photographing apparatus and configured to display the generated image; a determination unit configured to determine whether the auxiliary display unit is switched on or off; and a self-shot setting unit configured to set a self-shot mode when the auxiliary display unit is switched from an 'off' state to an 'on' state.

The self-shot setting unit may include a face recognition unit configured to recognize a human face from the generated image; and a focus adjustment unit configured to focus on the recognized face.

The self-shot setting unit may include a facial expression determination unit configured to determine whether the recognized face is smiling; and a shooting controller configured to control the shooting unit to capture an image of the recognized face if the recognized face is smiling.

The digital photographing apparatus may be configured to perform a quick-view function in which after an image is captured, the captured image is temporarily displayed on the main display unit and the auxiliary display unit.

The digital photographing apparatus may be configured to continuously perform the quick-view function until a quick-view function end signal is received, if the captured image is captured with the self-shot setting on.

The digital photographing apparatus may be configured to return to a shooting mode, when the quick-view function end signal is received.

The auxiliary display unit may be configured to switch from an 'off' state to an 'on' state if a user taps the auxiliary display unit.

The digital photographing apparatus may include an acceleration sensor configured to sense the tap applied to the auxiliary display unit by the user.

A method of controlling a digital photographing apparatus having a main display unit configured to display a captured image and an auxiliary display unit mounted on a front of the apparatus is disclosed. The method including generating a live image of a subject; determining whether the auxiliary display unit is switched on or off; and entering a self-shot mode when the auxiliary display unit is switched from an 'off' state to an 'on' state.

Entering a self-shot mode may include recognizing a human face from the generated live image signal; and focusing on the recognized face.

The method may include determining whether the recognized face is smiling; and if the recognized face is smiling, then capturing an image of the recognized face.

The method may include capturing an image of the subject; and performing a quick-view function by temporarily displaying the captured image on the main display unit and the auxiliary display unit.

The method may include continuously displaying the captured image on the main display unit and the auxiliary display unit until a quick-view function end signal is received.

The method may include if the quick-view function end signal is received, returning back to a regular shooting mode.

The method may include switching the auxiliary display unit from the 'off' state to the 'on' state if a user applies a tap to the auxiliary display unit.

The method may include sensing the tap applied to the auxiliary display unit by the user.

A computer program product, comprising: a computer-readable medium is disclosed. The computer-readable medium including a first set of codes for causing a digital photographing apparatus to generating a live image of a subject; a second set of codes for causing the apparatus to determine whether an auxiliary display unit is switched on or off; a third set of codes for causing the apparatus to enter a self-shot mode when the auxiliary display unit is switched from an 'off' state to an 'on' state; a fourth set of codes for causing the apparatus to capture an image of the subject; and a fifth set of codes for causing the apparatus to perform a quick-view function by temporarily displaying the captured image on a main display unit on a back of the apparatus and the auxiliary display unit on the front of the apparatus.

BRIEF DESCRIPTION OF THE DRAWINGS

The above and other features and advantages of embodiments of the invention will become more apparent by describ

DETAILED DESCRIPTION OF THE INVENTION

Hereinafter, exemplary embodiments of the invention will be described in detail with reference to the accompanying drawings. Like reference numerals denote like elements throughout the drawings.

Figure 1:
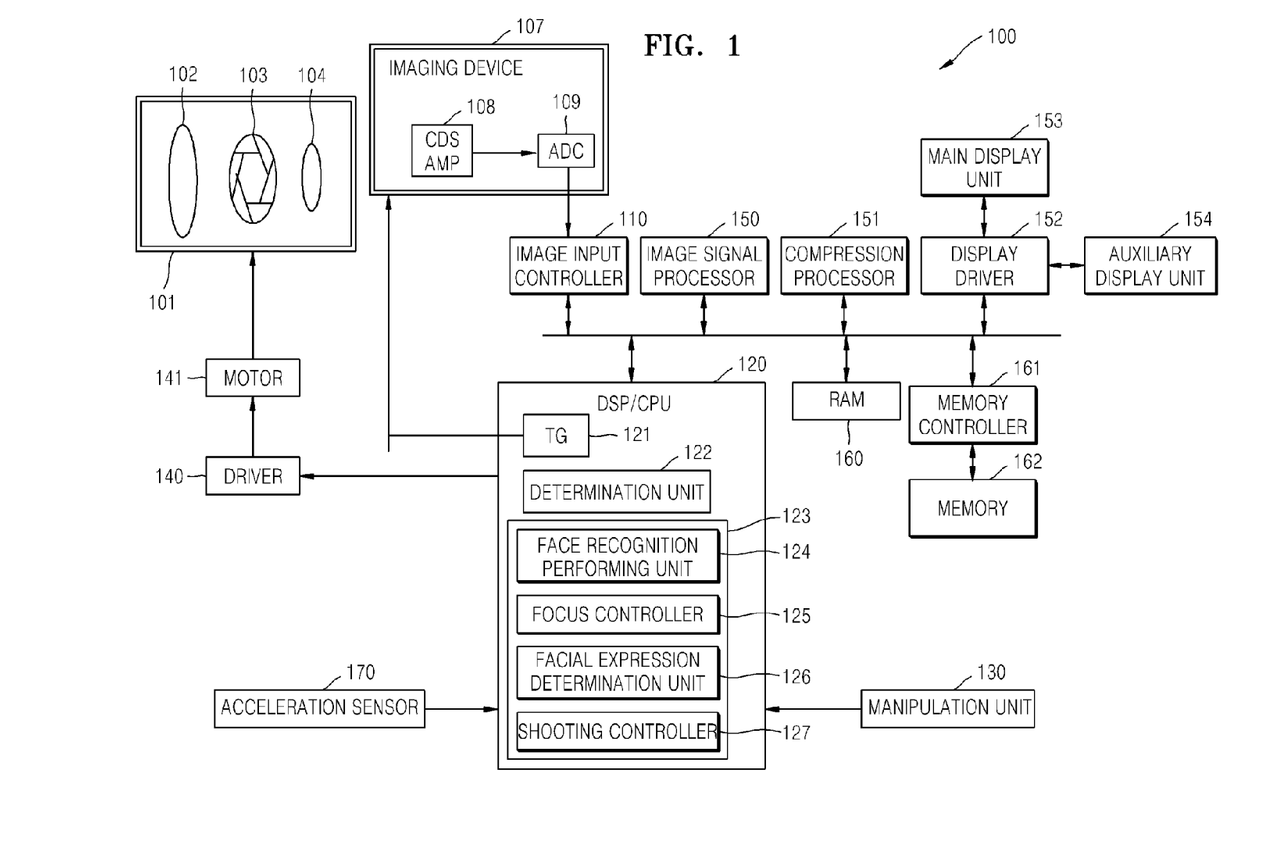
- FIG. 1 is a block diagram illustrating an internal construction of a digital photographing apparatus according to an embodiment of the invention.
Figure 2A:
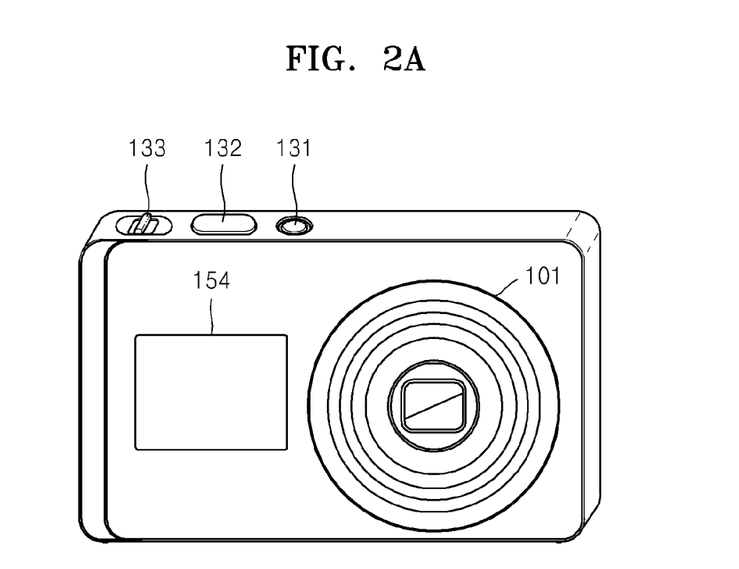
FIG. 2A is a front perspective view of the digital photographing apparatus of FIG. 1.
Figure 2B:
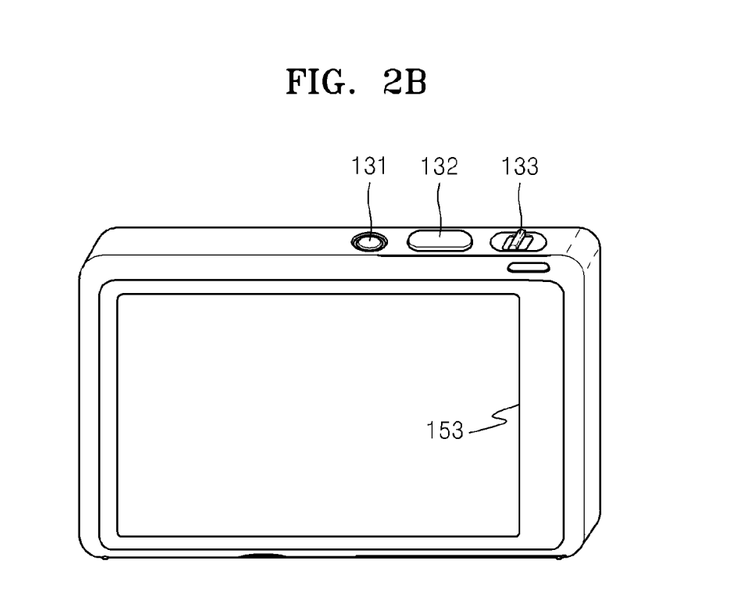
FIG. 2B is a rear perspective view of the digital photographing apparatus of FIG. 1.

FIG. 1 is a block diagram illustrating an internal construction of a digital photographing apparatus 100 according to an embodiment of the invention. FIG. 2A is a front perspective view of the digital photographing apparatus 100 of FIG. 1. FIG. 2B is a rear perspective view of the digital photographing apparatus 100 of FIG. 1.

The digital photographing apparatus 100 includes an optical imaging system 101, an imaging device 107, an image input controller 110, a digital signal processor/central processing unit (DSP/CPU) 120, a manipulation unit 130, a driver 140, a motor 141, an image signal processor 150, a compression processor 151, a display driver 152, a main display unit 153, an auxiliary display unit 154, a random access memory (RAM) 160, a memory controller 161, a memory 162, and an acceleration sensor 170.

The optical imaging system 101 includes, for example, a lens group including a zoom lens 102, a focus lens 104, etc., and an aperture 103. The optical imaging system 101 is an optical system that focuses light of a subject, which is received from the outside, on the imaging device 107, that is, the optical imaging system 101 allows the light of the subject to be incident on the imaging device 107. The zoom lens 102 changes a focal length to adjust a viewing angle. The aperture 103 is a device that adjusts the amount of light incident on the imaging device 107. The focus lens 104 moves from a first side to a second side or from the second side to the first side along an optical axis in order to focus a subject on an imaging surface of the imaging device 107. The aperture 103 and the focus lens 104 are driven by the motor 141 that receives a driving signal from the driver 140. Although FIG. 1 illustrates one driver 140 and one motor 141, each of the aperture 103 and the focus lens 104 may include a pair of a driver and a motor.

The imaging device 107 is an example of a photoelectric conversion device, and includes a plurality of sub-devices for each converting light incident thereon into an electrical signal. The imaging device 107 may be embodied as a charge-coupled device (CCD) sensor or a complementary metal-oxide semiconductor (CMOS) sensor.

A mechanical shutter (not shown) may be used to block light when photographing is not performed and to allow light to be incident on the imaging device 107 when photographing is performed, thereby controlling an exposure time of the imaging device 107. However, the invention is not limited to the mechanical shutter, and an electronic shutter (not shown) may be used instead. It is possible to operate the mechanical shutter or the electronic shutter by pressing a shutter release button 132 connected to the DSP/CPU 120.

The imaging device 107 may further include a correlated double sampling/amplifier (CDS/AMP) unit 108 and an analog digital convertor (ADC) 109. The CDS/AMP unit 108 not only removes low-frequency noise in the electrical signal generated in the imaging device 107 but also amplifies the electrical signal to a predetermined level. The ADC 109 converts the electrical signal received from the CDS/AMP unit 108 into a digital signal, and supplies the digital signal to the image input controller 110.

The image input controller 110 processes the digital signal received from the ADC 109 to generate an image signal that can be image-processed. The image input controller 110 supplies the image signal to, for example, the image signal processor 150. The image input controller 110 controls data to be read from or to be written to the RAM 160.

The optical imaging system 101, the imaging device 107, and the image input controller 110 may constitute a shooting unit (not shown) that generates an image signal by capturing an image of a subject.

The image signal processor 150 receives the image signal from the image input controller 110, and image-processes the image signal based on a white balance (WB) control value, a gamma value ($\gamma$), a sharpness control value, etc. Also, the image signal processor 150 calculates an auto focusing (AF) evaluation value based on the image signal received from the image input controller 110 and transmits the AF evaluation value to the DSP/CPU 120. The processed image signal may be supplied to the compression processor 151. Alternatively, the processed image signal may be displayed as a live-view image on the main display unit 153 and/or the auxiliary display unit 154 via the RAM 160, the display driver 152, etc.

The DSP/CPU 120 may function as an arithmetic device or a control device according to a program, and controls operation of the elements of the digital photographing apparatus 100. The DSP/CPU 120 drives the optical imaging system 101 by supplying a signal to the driver 140, for example, based on focus control or exposure control. Also, the DSP/CPU 120 controls the elements of the digital photographing apparatus 100 based on a manipulation signal received from the manipulation unit 130. In the current embodiment, the DSP/CPU 120 is embodied as a single device but may be embodied as a plurality of CPUs provided that signal commands and manipulation commands are processed by the CPUs, respectively.

The DSP/CPU 120 may include a timing generator 121, a determination unit 122, and a self-shot setting unit 123.

The timing generator 121 supplies a timing signal to the imaging device 107 or the CDS/AMP unit 108, and controls an exposure time of each of a plurality of pixels constituting the imaging device 107 or reading of electric charges from the pixels.

The determination unit 122 determines whether the auxiliary display unit 154 is in an "on" state or an "off" state. When the auxiliary display unit 154 is switched from the "off" state to the "on" state, the determination unit 122 senses the switch and informs the self-shot setting unit 123 of such a state change.

The self-shot setting unit 123 sets a shooting condition appropriate for performing a self-shot, i.e., a self-shot mode, when the auxiliary display unit 154 is switched from the "off" state to the "on" state. That is, the self-shot setting unit 123 executes an method for performing the self-shot. Here, the self-shot denotes a user photographing himself/herself. The self-shot setting unit 123 may include a face recognition unit 124 and a focus adjustment unit 125.

The face recognition unit 124 recognizes a human face from a live view image. Here, the live view image may be obtained by an image signal that is generated by photographing a subject and an image processed by the image signal processor 150. A human face may be recognized using a variety of existing published face recognition algorithms.

If a human face is recognized by performing face recognition, then the focus adjustment unit 125 focuses on the recognized face. The focus adjustment unit 125 calculates a focal location at which the recognized face is most clearly seen, based on the AF evaluation value calculated by the image signal processor 150. The driver 140 is controlled based on the focal location in order to supply a driving signal to the motor 141. When either face recognition is performed or the method is executed to perform the self-shot, such a focus control may be auto focusing that is automatically performed regardless of whether the shutter release button 132 is in a half depressed state. Here, the AF evaluation value may be, for example, a contrast value of an image when focus control is performed by measuring contrast. If the contrast value is a peak value, the focus adjustment unit 125 may determine that an image of a subject is focused on the imaging surface of the imaging device 107. However, the invention is not limited to this method and focus control may be performed in various ways.

When a human face is recognized through face recognition, a graphical user interface (GUI) generation unit (not shown) may generate a GUI representing a face recognition frame on a part of an image, which corresponds to the recognized face, and then display the image on the main display unit 153 and/or the auxiliary display unit 154. Also, focus control may be performed by calculating an AF evaluation value of a region surrounded by the displayed face recognition frame. The GUI generation unit may be an example of an AF detection region setting unit.

As described above, it is possible to capture a clear self-shot image of a user by performing face recognition and focusing on a recognized face when a shutter signal is given from the user.

In the current embodiment, in order to assist a self-shot function of the digital photographing apparatus 100, the self-shot setting unit 123 may further include a facial expression determination unit 126 and a shooting controller 127.

The facial expression determination unit 126 determines whether a recognized human face is smiling, and the shooting controller 127 controls a still image to be generated when it is determined that the recognized face is smiling. The facial expression determination unit 126 determines whether the recognized human face is smiling for example by detecting a mouth from the recognized face and analyzing whether the ends of the mouth point upward. In general, an image of a person is captured when the person is smiling. Thus, while the method for performing the self-shot function is being executed, the facial expression of a recognized face is analyzed and a shutter signal is generated when the recognized face is a smiling face. The shutter signal may be the same as a signal generated when the shutter release button 132 is pressed.

As described above, when a recognized face is a smiling face, a still image is automatically generated, thereby preventing the image from shaking from the shutter release button 132 being pressed.

In the current embodiment, the digital photographing apparatus 100 may further include the acceleration sensor 170 in order to sense an impact applied by a user. The acceleration sensor 170 may sense motion of the digital photographing apparatus 100 and supply a signal corresponding to the sensed motion to the DSP/CPU 120. In the current embodiment, when the user applies an impact to the auxiliary display unit 154 by tapping the auxiliary display unit 154, the acceleration sensor 170 senses the impact and supplies the signal corresponding to the impact to the DSP/CPU 120. The DSP/CPU 120 may analyze the supplied signal, determine whether the applied impact is caused by tapping the auxiliary display unit 154, and switch the auxiliary display unit 154 from an 'off' state to an 'on' state.

The manipulation unit 130 includes, for example, a power button 131, the shutter release button 132, and a zoom button 133 that are installed on the digital photographing apparatus 100, and transmits a manipulation signal to the DSP/CPU 120 based on a user's manipulation. Also, in the current embodiment, the digital photographing apparatus 100 may receive an input signal by using the main display unit 153 as a touch screen.

The compression processor 151 receives from the image signal processor 150 an image signal that is not compressed, and compresses the image signal in a compressed format, e.g., a JPEG format or an LZW format. The compression processor 151 compresses an image signal, e.g., a still image, which is generated in response to a shutter signal, into image data, and transmits an image file including the image data, for example, to the memory controller 161. The compression processor 151 may be an example of an image file generator.

The display driver 152 drives the main display unit 153 and/or the auxiliary display unit 154 to display an image. For example, the display driver 152 receives image data from the RAM 160, and displays an image of the image data on the main display unit 153 and/or the auxiliary display unit 154. The display driver 152 may individually control the main display unit 153 and the auxiliary display unit 154. That is, display driver 152 may display the image by either switching on only the main display unit 153 or switching on both the main display unit 153 and the auxiliary display unit 154.

The main display unit 153 and/or the auxiliary display unit 154 display an image captured by the shooting unit. In this case, the auxiliary display unit 154 is installed on the same plane of a body of the digital photographing apparatus 100 according to the current embodiment, on which a zoom lens, etc., are installed. That is, the auxiliary display unit 154 may be installed on a front part of the digital photographing apparatus 100.

In detail, images that the main display unit 153 and/or the auxiliary display unit 154 can display may include live-view images and quick-view images.

Here, the live-view images are real-time images generated from image signals obtained before a still image is generated or captured. The image signals obtained before the still image is generated or captured may be generated by the shooting unit and may be image-processed. The quick-view images are still images that are generated in response to a shutter signal and that are displayed only for a predetermined length of time. A function of temporarily displaying the still image is referred to as a 'quick-view function'.

In general, after the predetermined length of time, the displaying of a quick-view image ends and a mode is returned to a shooting mode. However, in the digital photographing apparatus 100 according to the current embodiment, if a still image is generated while the auxiliary display unit 154 is switched from the 'off' state to the 'on' state and the self-shot setting unit 123 operates, i.e., while the self-shot function is performed, then the DSP/CPU 120 continuously performs the quick-view function until the DSP/CPU 120 receives a quick-view function end signal. When the quick-view function end signal is received, the displaying of a quick-view image on the main display unit 153 and/or auxiliary display unit 154 ends and a mode is returned to the shooting mode. The quick-view function end signal may be supplied in various ways. For example, the quick-view function end signal may be supplied by pressing the shutter release button 132 in a half depressed state or touching a touch screen of the main display unit 153.

Also, the main display unit 153 and/or the auxiliary display unit 154 may display various setting screens of the digital photographing apparatus 100, a reconstructed image that is captured and recorded, a face recognition frame generated by the GUI generation unit, etc.

Also, each of the main display unit 153, the auxiliary display unit 154, and the display driver 152 may include a liquid crystal display (LCD) and an LCD driver but the invention is not limited thereto. For example, each of the main display unit 153, the auxiliary display unit 154, and the display driver 152 may include an organic electro-luminescent display (OELD) and an OELD driver. The auxiliary display unit 154 may be protected against an impact from the outside by coating outer surfaces of the auxiliary display unit 154 with tempered glass.

The RAM 160 temporarily stores various data. Although not shown in the drawings, the RAM 160 may include a video RAM (VRAM) as an image display memory and a synchronous DRAM (SDRAM) that temporarily stores image data of a captured image.

The memory controller 161 controls image data to be written to the memory 162 or image data or setting information to be read from the memory 162. The memory 162 may be, for example, an optical disc, such as a compact disc (CD), a digital versatile disc (DVD), a Blue-ray disc, a magneto optical disc, a magnetic disc, or a semiconductor storage medium, and stores image data. The image data may be included in an image file generated by the compression processor 151. The memory controller 161 and the memory 162 may be constructed to be detachable from the digital photographing apparatus 100.

A series of operations performed by the digital photographing apparatus 100 may be processed either using hardware or software according to a program stored in a computer.

Figure 3A:
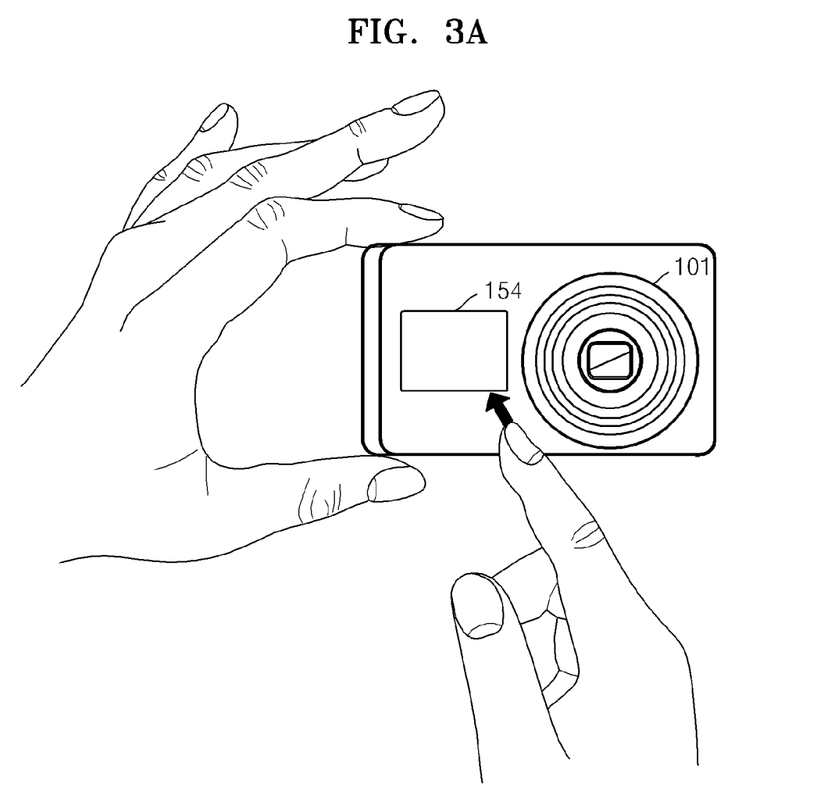
FIGS. 3A and 3B are schematic views illustrating a method of performing a self-shot function by using the digital photographing apparatus of FIG. 1, according to an embodiment of the invention.
Figure 3B:
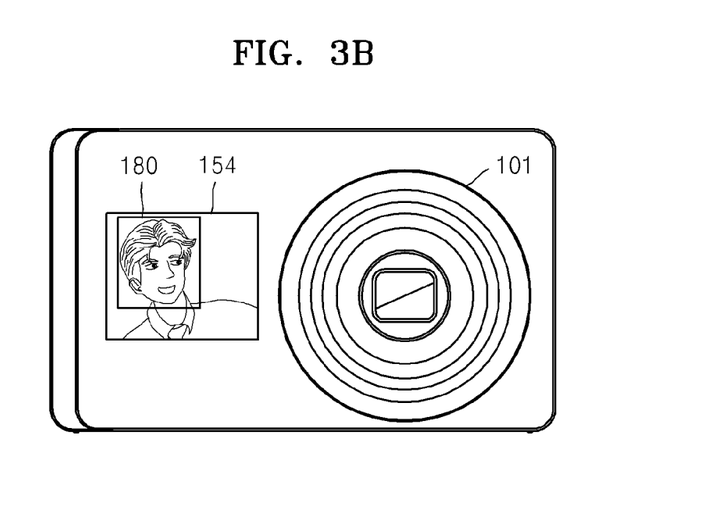

The operations of the digital photographing apparatus 100 of FIG. 1 according to the current embodiment will now be described with reference to FIGS. 3A and 3B. FIGS. 3A and 3B are schematic views illustrating a method of performing a self-shot function by using the digital photographing apparatus 100 of FIG. 1, according to an embodiment of the invention.

Referring to FIG. 3A, the auxiliary display unit 154 is mounted on the same plane on which the optical imaging system 101 including a lens is installed, and is switched off at first. When a user taps the auxiliary display unit 154, for example, with his/her finger, the acceleration sensor 170 included in the digital photographing apparatus 100 senses the tapping and switches on the auxiliary display unit 154.

Referring to FIG. 3B, when the auxiliary display unit 154 is switched on, a live-view image is displayed in real time. When the auxiliary display unit 154 is switched on, the self-shot function is also automatically performed. As described above, when face recognition included in the self-shot function is performed to recognize the face of a user, a face recognition frame 180 is displayed to surround the recognized face as illustrated in FIG. 3B. When focus control that is also included in the self-shot function is performed, an AF evaluation value of a region including the recognized face which is surrounded by the face recognition frame 180 is calculated and analyzed. If the user's face is smiling, the digital photographing apparatus 100 analyzes the facial expression of the face and automatically supplies a shutter signal in order to generate a still image.

Although not shown in FIGS. 3A and 3B, if while the self-shot function is performed, the still image is generated either by pressing the shutter release button 132 or in response to a shutter signal generated when the recognized face is smiling, then a quick-view image may be continuously displayed even after a predetermined length of time. The displaying of the quick-view image may end when a quick-view function end signal is given, e.g., when the main display unit 153 is touched or the shutter release button 132 is pressed.

As described above, the digital photographing apparatus 100 according to the current embodiment senses switching of the auxiliary display unit 154 from the 'off' state to the 'on' state, recognizes a user's face by performing the self-shot function when the switching is sensed, automatically controls focusing on the recognized face, determines whether the user's face is smiling, and controls a still image to be automatically generated (or captured) when the user's face is smiling, thereby allowing the user to easily take a self-shot.

Figure 4:
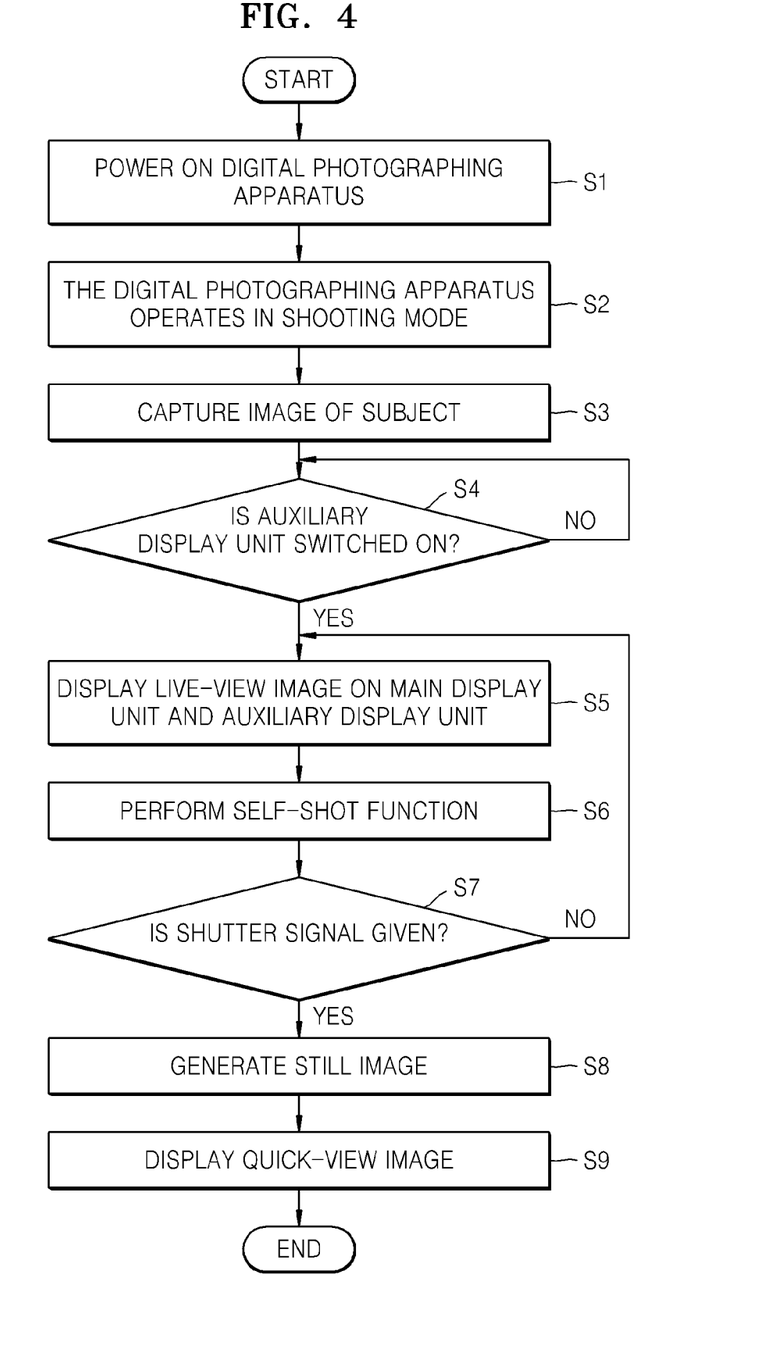
FIG. 4 is a flowchart illustrating a method of controlling the digital photographing apparatus of FIG. 1, according to an embodiment of the invention.

FIG. 4 is a flowchart illustrating a method of controlling the digital photographing apparatus 100 of FIG. 1, according to an embodiment of the invention. In the current embodiment, the digital photographing apparatus 100 includes the main display unit 153 that displays a captured image, and the auxiliary display unit 154 that is mounted on the same plane on which a lens is installed.

Referring to FIG. 4, when the digital photographing apparatus 100 is powered on (operation S1), the digital photographing apparatus 100 operates in a shooting mode which is either set as a default mode or as manipulated by a user (operation S2). Next, in the shooting mode, an image of a subject is captured to obtain a plurality of image signals (operation S3).

Next, it is determined whether the auxiliary display unit 154 is switched on or off in the shooting mode (operation S4). If the auxiliary display unit 154 is switched from the 'off' state to the 'on' state, a live-view image is displayed on the main display unit 153 and the auxiliary display unit 154 (operation S5). Although it is described in the current embodiment that the digital photographing apparatus 100 is kept in a standby mode when the auxiliary display unit 154 is in the 'off' state, the digital photographing apparatus 100 may operate in the conventional shooting mode even in the standby mode.

When the auxiliary display unit 154 is switched to the 'on' state, a user performs the self-shot function of setting a photographing condition in order that the user photographs himself/herself (operation S6). The self-shot function may include face recognition, focus control, a function of determining the facial expression of a recognized face, and a function of automatically supplying a shutter signal, which will be described in detail with reference to FIG. 5 later.

Next, it is determined whether the shutter signal is given from the user (operation S7). If the shutter signal is given from the user, a still image is obtained from an image signal that is generated when the shutter signal is given from the user from among the image signals (operation S8). Then, a quick-view image that shows the still image is displayed for a predetermined length of time (operation S9). A function of temporarily displaying the still image is referred to as a quick-view function.

As described above, in the method of controlling the digital photographing apparatus 100 according to the current embodiment, the switching of the auxiliary display unit 154 from the 'off' state to the 'on' state is sensed and the self-shot function is performed when this switching is sensed, thereby allowing the user to easily take a self-shot.

The self-shot function will now be described in detail with reference to FIG. 5.

Figure 5:
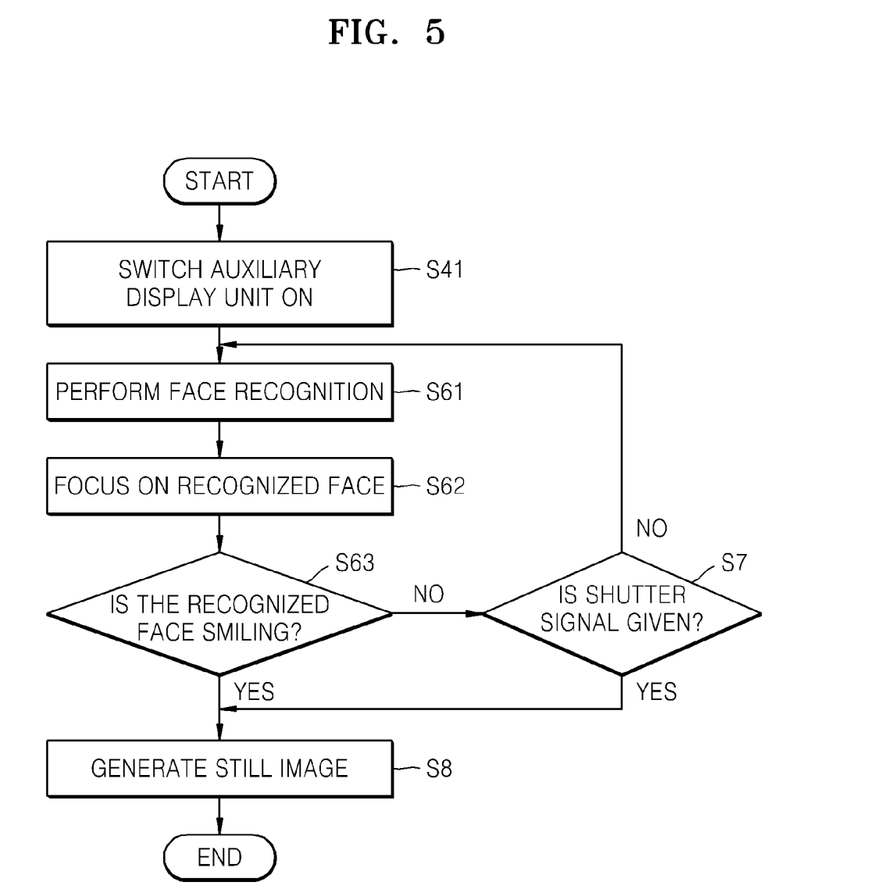
FIG. 5 is a flowchart illustrating a method of controlling the digital photographing apparatus of FIG. 1, according to another embodiment of the invention.

FIG. 5 is a flowchart illustrating a method of controlling the digital photographing apparatus 100 of FIG. 1, according to another embodiment of the invention. The method of FIG. 5 is a modification of the method of FIG. 4. First, operations S1 to S4 of the method of FIG. 4 are performed. Next, if it is determined in operation S4 that the auxiliary display unit 154 is switched from the 'on' state to the 'off' state, the auxiliary display unit 154 is switched on (operation S41). In this case, the auxiliary display unit 154 may be switched from the 'off' state to the 'on' state when a user applies an impact to the auxiliary display unit 154, for example, by tapping the auxiliary display unit 154, and the acceleration sensor 170 included in the digital photographing apparatus 100 senses the impact.

When such a change in the state of the auxiliary display unit 154 is sensed, face recognition is performed on a captured image in order to perform the self-shot function (operation S61). That is, the user's face is recognized based on a plurality of image signals. Next, the recognized face is focused on (operation S62).

When the user's face is focused on, it is determined whether the face is smiling (operation S63). If it is determined in operation S63 that the user's face is smiling, a shutter signal is generated in order to obtain a still image. Otherwise, if it is determined in operation S63 that the user's face is not smiling, it is determined whether the user generates the shutter signal by pressing the shutter release button 132 (operation S7).

If the shutter signal is generated in operation S6 or S7, the still image is generated from an image signal among the image signals (operation S8). If the shutter signal is not generated in operation S6 or S7, the self-shot function is continuously performed in a shooting mode.

As described above, in the method of controlling the digital photographing apparatus 100 illustrated in FIG. 5, when the auxiliary display unit 154 is switched from the 'off' state to the 'on' state, the self-shot function that includes face recognition, focus control, a function of determining the facial expression of a recognized face, and a function of automatically supplying a shutter signal is performed, thereby allowing the user to easily take a self-shot.

Figure 6:
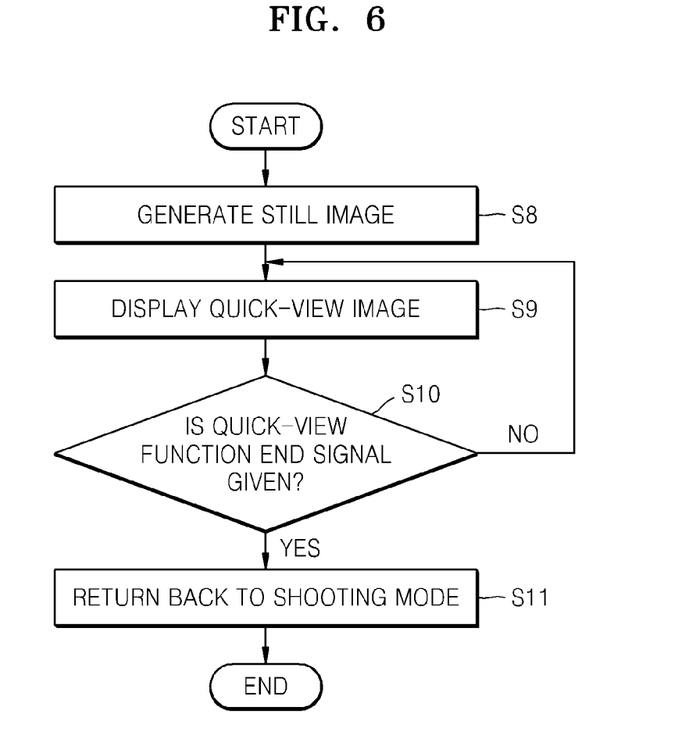
FIG. 6 is a flowchart illustrating a method of controlling the digital photographing apparatus of FIG. 1, according to another embodiment of the invention.

FIG. 6 is a flowchart illustrating a method of controlling the digital photographing apparatus 100 of FIG. 1, according to another embodiment of the invention. First, operations S1 through S8 of the method of FIG. 4 are performed. If a still image is obtained in operation S8, a quick-view image is displayed (operation S9). That is, the quick-view function is performed.

If the self-shot function is not performed during the performing of operations S1 through S8, the displaying of the quick-view image automatically ends after a predetermined length of time, and then, a mode is returned to the shooting mode.

Otherwise, if the still image is generated during the performing of the self-shot function, the quick-view function is continuously performed when the quick-view image is displayed, i.e., unless any control signal is given.

The DSP/CPU 100 determines whether a quick-view function end signal is given (operation S10). If the quick-view function end signal is not given, the quick-view function is continuously performed. Otherwise, if the quick-view function end signal is given, the quick-view function ends and the digital photographing apparatus 100 returns back to the shooting mode (operation S11).

As described above, in the method of controlling the digital photographing apparatus 100 of FIG. 6, the quick-view function is continuously performed unless the quick-view function end signal is given, so that the user may have a plenty of time to check the still image after taking a self-shot.

A program for executing the methods of controlling the digital photographing apparatus 100, according to the above embodiments, may be stored in a recording medium. Here, the recording medium may be the memory 162 illustrated in FIG. 1 or various types of recording medium. The various types of recording medium include a magnetic storage medium, e.g., a random-access memory (ROM), a floppy disk, and a hard disc; and an optical storage medium, e.g., a CD-ROM, and a DVD. The recording medium may be limited to physical recording medium.

The various illustrative units described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. While the invention has been particularly shown and described with reference to exemplary embodiments thereof, it will be understood by those of ordinary skill in the art that various changes in form and details may be made therein without departing from the spirit and scope of the invention as defined by the following claims.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A digital photographing apparatus comprising:
   a shooting unit, configured to generate a live image of a subject;
   a main display unit, configured to display the generated image;
   an auxiliary display unit mounted on a front of the digital photographing apparatus and configured to display the generated image;
   a determination unit configured to determine whether the auxiliary display unit is switched on or off; and a self-shot setting unit configured to set a self-shot mode in response to the auxiliary display unit being switched from an "off" state to an "on" state.

2. The digital photographing apparatus of claim 1, wherein the self-shot setting unit comprises:
a face recognition unit configured to recognize a human face from the generated image when a change in the state of the auxiliary display unit from the "off" state to the "on" state is sensed;
a focus adjustment unit configured to focus on the recognized face; and
a graphical user interface generation unit that generates a face recognition frame on a part of the image on the auxiliary display unit when the human face is recognized.

3. The digital photographing apparatus of claim 2, wherein the self-shot setting unit further comprises:
a facial expression determination unit configured to determine whether the recognized face is smiling; and
a shooting controller configured to control the shooting unit to capture an image of the recognized face if the recognized face is smiling.

4. The digital photographing apparatus of claim 1, wherein the apparatus is configured to perform a quick-view function in which after an image is captured in response to a press of a shutter release button, and the captured image is temporarily displayed on the main display unit and the auxiliary display unit.

5. The digital photographing apparatus of claim 4, wherein the apparatus is further configured to perform the quick-view function until a quick-view function end signal is received, when the captured image is captured with the self-shot setting on.

6. The digital photographing apparatus of claim 5, wherein, the apparatus is further configured to return to a shooting mode, when the quick-view function end signal is received.

7. The digital photographing apparatus of claim 1, wherein the auxiliary display unit is configured to switch from an "off" state to an "on" state if a user taps the auxiliary display unit.

8. The digital photographing apparatus of claim 7, further comprising an acceleration sensor configured to sense the tap applied to the auxiliary display unit by the user.

9. The digital photographing apparatus of claim 1, wherein the self-shot setting unit comprises:
a face recognition unit configured to recognize a human face from the generated image when a change in the state of the auxiliary display unit from the "off" state to the "on" state is sensed; and
a focus adjustment unit configured to focus on the recognized face regardless of whether a shutter release signal is input.

10. A method of controlling a digital photographing apparatus having a main display unit configured to display a captured image and an auxiliary display unit mounted on a front of the apparatus, the method comprising:
generating a live image of a subject;
determining whether the auxiliary display unit is switched on or off; and
entering a self-shot mode in response to the auxiliary display unit being switched from an "off" state to an "on" state.

11. The method of claim 10, wherein entering a self-shot mode comprises:
recognizing a human face from the generated live image signal when a change in the state of the auxiliary display unit from the "off" state to the "on" state is sensed;
focusing on the recognized face; and
generating a face recognition frame on a part of the image on the auxiliary display unit when the human face is recognized.

12. The method of claim 11, further comprising:
determining whether the recognized face is smiling; and
if the recognized face is smiling, then capturing an image of the recognized face.

13. The method of claim 10, further comprising:
in response to a shutter release button being pressed,
capturing an image of the subject; and
performing a quick-view function by temporarily displaying the captured image on the main display unit and the auxiliary display unit.

14. The method of claim 13, further comprising:
continuously displaying the captured image on the main display unit and the auxiliary display unit each time an image is captured, until a quick-view function end signal is received.

15. The method of claim 14, further comprising: if the quick-view function end signal is received, returning back to a regular shooting mode.

16. The method of claim 10, further comprising switching the auxiliary display unit from the "off" state to the "on" state if a user applies a tap to the auxiliary display unit.

17. The method of claim 16, further comprising sensing the tap applied to the auxiliary display unit by the user.

18. A non-transitory computer program product, comprising: a computer-readable medium comprising:
a first set of codes for causing a digital photographing apparatus to generating a live image of a subject;
a second set of codes for causing the apparatus to determine whether an auxiliary display unit is switched on or off;
a third set of codes for causing the apparatus to enter a self-shot mode in response to the auxiliary display unit being switched from an "off" state to an "on" state;
a fourth set of codes for causing the apparatus to capture an image of the subject; and
a fifth set of codes for causing the apparatus to perform a quick-view function by temporarily displaying the captured image on a main display unit on a back of the apparatus and the auxiliary display unit on the front of the apparatus.

* * * * *